United States Patent [19]

Gans

[11] 4,138,115
[45] Feb. 6, 1979

[54] MAGNETIC SQUARE AND JIG SAW PUZZLE

[76] Inventor: Ernest Gans, 84-39 153rd Ave., Howard Beach, N.Y. 11414

[21] Appl. No.: 752,407

[22] Filed: Dec. 20, 1976

[51] Int. Cl.² .............................................. A63F 9/06
[52] U.S. Cl. .................................. 273/153 R; 273/156
[58] Field of Search .......... 273/130 C, 135 B, 137 R, 273/137 AE, 153 R, 156, 157 R; 35/48 A

[56] References Cited

U.S. PATENT DOCUMENTS

| 300,534 | 6/1884 | Van Bibber | 273/156 UX |
| 1,251,822 | 1/1918 | Prendergast | 273/156 |
| 1,892,318 | 12/1932 | Pressey | 35/48 A |
| 1,959,040 | 5/1934 | Schilling | 273/130 C |
| 2,073,551 | 3/1935 | Crasnoff | 273/137 R X |
| 2,506,189 | 5/1950 | Attridge | 273/157 R |
| 2,953,380 | 9/1960 | Hassenbach | 273/157 R |
| 3,618,951 | 11/1971 | Parrick et al. | 273/135 B |

FOREIGN PATENT DOCUMENTS

| 594725 | 11/1947 | United Kingdom | 273/130 C |
| 604175 | 6/1948 | United Kingdom | 273/157 R |

OTHER PUBLICATIONS

Selchow and Richter Co. Advertisement, Playthings, Nov. 1963, p. 11.

*Primary Examiner*—Anton O. Oechsle
*Attorney, Agent, or Firm*—Leonard W. Suroff

[57] ABSTRACT

A number problem game which comprises a playing board having a planar surface thereon, with an odd number of squares arranged in an equal number of horizontal and vertical rows intersecting each other on the playing board, as well as a plurality of playing elements with each element having a different numbered indicia thereon. The elements being arrangeable on the squares of the board to satisfy a predetermined value which is satisfied by the arithmetical equation:

$$[\sqrt{n}\,(a + N)]/2 = X$$

such that when the plurality of elements are properly positioned on the squares, the sum of the numbered indicia on the elements on each of the horizontal and vertical rows is equal to X, and a plurality of borders on the playing board in surrounding relationship to respective groups of odd numbers of the squares are provided. Each one of the borders having indicium thereon equivalent to one of the predetermined values of X. The sum of the numbered indicia on each of the elements positioned on the diagonal rows formed by the squares is also equal to the sum specified by X in each of the respective groups. The mathematical game may take the form of a puzzle having interlocking elements with a border having indicium thereon equal to the predetermined numeral solution.

20 Claims, 10 Drawing Figures

MAGNETIC SQUARE AND JIG SAW PUZZLE

BACKGROUND OF THE INVENTION

1. Field of the Invention

The present invention relates to a unique and novel game of numbers, wherein elements having numbered indicia thereon have to be arranged in a proper arrangement in order to solve the mathematical puzzle or problem that the game provides on either a game board or jig saw puzzle format.

2. Description of the Prior Art

There has been proposed in the prior art number games in which particular solutions were required to assemble loose pieces in columns, rows, and diagonals, such that the sum of the numerals of each will equal the same amount. One such example of a game is illustrated in U.S. Pat. No. 2,170,909. I have discovered that it is possible by determination of a specific formula to provide a number game that provides for puzzles on a single playing board, or jig saw puzzle arrangement, that may have differing degrees of difficulty, depending upon the age and capability of the player.

The distinctions of my game and the problems created thereby present problems of varying degree, not capable of obtainment with the above reference prior art patent. The advantages and distinctions of my invention over the prior art will become more clearly evident as the disclosure proceeds.

OBJECTS OF THE INVENTION

An object of the present invention is to provide a number problem game in which the playing board may contain more than one group of problems that have to be solved to win the game.

Another object of the present invention is to provide a number problem game that has solutions thereto, by placing thereon playing elements having different sequentially numbered incidia, that are magnetically attracted to the game board.

Another object of the present invention is to provide a number problem game on which the playing board may contain four different mathematical problems extending in concentric relationship to each other.

Another object of the present invention is to provide a mathematical numerical game in the form of a jig saw puzzle that is educational and challenging.

Another object of the present invention is to provide a numerical game that is interesting to play and aids in teaching one rapid addition.

Other objects and advantages of the present invention will become apparent as the disclosure proceeds.

SUMMARY OF THE INVENTION

A number problem game which comprises a playing board having a planar surface thereon, with an odd number of squares arranged in an equal number of horizontal and vertical rows intersecting each other on the playing board, as well as a plurality of playing elements with each element having a different consecutively numbered indicia thereon. The elements being arrangeable on the squares of the board to satisfy a predetermined value which is satisfied by the arithmetical equation:

$$[\sqrt{n}\,(a+N)]/2 = X$$

such that when the plurality of elements are properly positioned on the squares, the sum of the numbered indicia on the elements on each of the horizontal and vertical rows is equal to X, and a plurality of borders on the playing board in surrounding relationship to respective groups of odd numbers of the squares are provided. Each one of the borders has indicium thereon equivalent to one of the predetermined values of X. The sum of the numbered indicia on each of the elements positioned on the diagonal rows formed by the squares is also equal to the sum specified by X in each of the respective groups.

The playing board and each of the elements are fabricated from materials such that they are magnetically attracted to each other, and the plurality of playing elements may be divided into respective sets, with each of the sets being of a select number of elements for use in the solution of the game with one of the groups. Each of the sets of the elements may be readily distinguishable from each other.

The number problem game may also contain solution means adapted to be operatively positioned on the playing board for each of the respective groups, such that a player may quickly determine if the proper solution to the number game has been obtained.

The game may also be provided in the form of a jig saw puzzle with a border indicating the sum of the solution to the numerical puzzle.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
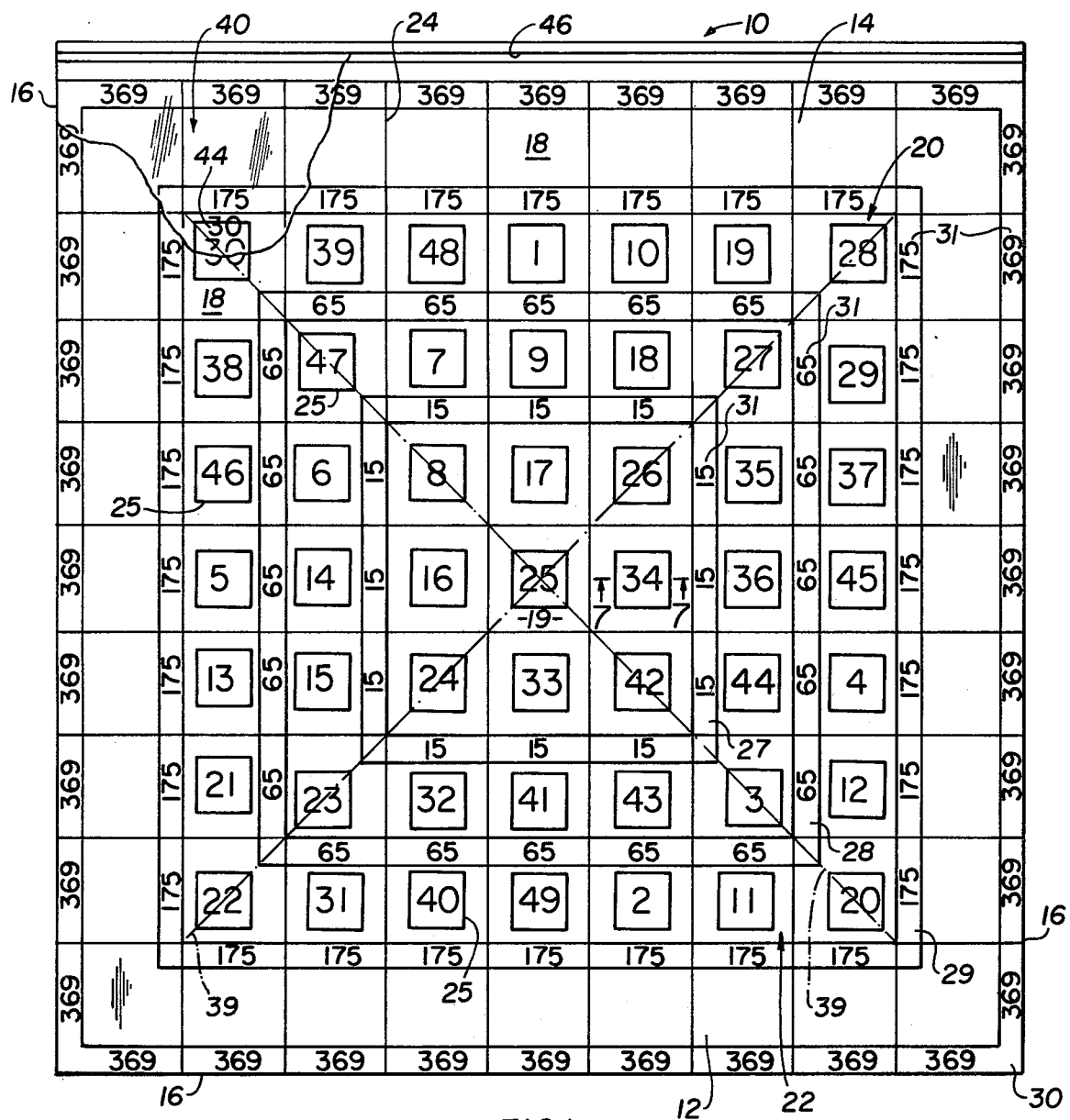
FIG. 1 is a top planar view of a playing board of a game of numbers in accordance with the present invention.

Referring to the drawings, there is illustrated in FIGS. 1 through 7 a number problem game 10 which, in accordance with one embodiment of the invention, comprises a playing board 12 having a planar surface 14 thereon with respective sides or ends 16. The board 12 may be square and fabricated from a magnetic material in whole or in part. An odd number of squares 18, having a central square 19, are arranged in an equal number of horizontal rows 20 and vertical rows 22, which intersect each other on the playing board 12. Dividing lines 24 may be provided between the respective squares 18.

A plurality of playing elements 25 are provided with each element having a different sequentially numbered indicia 26 thereon. The numbering of the indicia 26 may be consecutive or in a sequence other than consecutive that is of an equal interval. The elements 25 being arrangeable on the squares 18 of the board 12 to satisfy a predetermined value which is satisfied by the arithmetical formula:

$$\sqrt{n}\,(a+N)/2 = X \tag{1}$$

wherein:
a = first numbered indicia of a series
N = last numbered indicia of a series
n = total number of elements in a series
$\sqrt{n}$ = being an integer, and the interval in the series is a constant.

In this manner when the plurality of elements 25 are properly positioned on the squares 18, the sum of the numbered indicia on the elements 25 on each of the horizontal rows 20 and vertical rows 22 is equal to the number X. In addition, a plurality of borders 27, 28, 29, and 30 are provided on the playing board 12 in surrounding relationship to respective groups of odd numbers of the squares 18. Each one of the borders 27 through 30 having indicium 31 thereon equivalent to one of the predetermined values of X. The variety of the number X may vary in accordance with formula (1).

In addition, the sum of the numbered indicia on each of the elements 25 positioned on the diagonal rows 39 formed through central square 19, and the squares 18, is also equal to the sum specified by X. The solutions to formula (1) may be satisfied with the predetermined value of X on one of the borders 29 being 175. For this solution by which the equation or formula is satisfied there are provided 49 of the consecutively numbered elements numbered from 1 through 49, inclusive. Further, when the odd number of squares is 49, then they are divided into 7 of the horizontal rows and 7 of the vertical rows.

FIG. 1 has been illustrated with the solution to one problem of the game 10. The indicium 31 on the borders 27 through 30, inclusive, may include the numbers 15, 65, 175, and 369, respectively. In this arrangement each particular group of odd squares 18 defined by one of the borders 27 through 30, will require a different number of consecutively numbered elements 25. Towards this end there may be provided a plurality of playing elements 25 which are divided into respective sets 35, 36, 37, and 38, each of the sets 35 through 38 being of a select number of the elements 25 for use in the solution of the game 10 with one of the groups.

Figure 3:
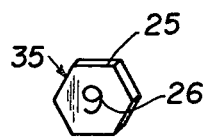
FIGS. 3 through 6 illustrate a perspective view of differing numbered playing elements that may be provided in different sets.
Figure 4:
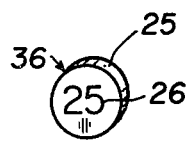
Figure 5:
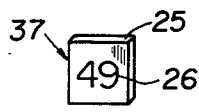
Figure 6:

Set 35, illustrated in FIG. 3, would include 9 elements which may be numbered 1 through 9. The elements 25 of set 35 may be hexagonal in shape. Set 36, illustrated in FIG. 4, would include 25 elements which may be numbered 1 through 25. The elements 25 of set 36 may be circular in shape. Set 37, illustrated in FIG. 5, would include 49 elements which may be numbered 1 through 49. The elements 25 of set 37 may be square in shape. Set 38, illustrated in FIG. 6, would include 81 elements which may be numbered 1 through 81. The elements 25 of set 38 may be of a diamond shape.

Figure 7:
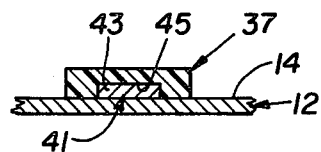
FIG. 7 is a sectional view along line 7—7 of FIG. 1.

In the manner described above the respective sets 35 through 38 are each readily distinguishable from each other, and four, or more, sets of elements 25 may be provided. Retaining means 41 in the form of a magnetic metallic member 43 may be contained in each element 25. As illustrated in FIG. 7, the member 43 is contained in a recess 45 of an element of set 35. In this manner each of the elements 25 is fabricated such that they are magnetically attracted to the game board 12.

Border 27 defines a total of 9 squares, border 28 defines a total of 25 squares, border 29 defines a total of 49 squares, and border 30 defines a total of 81 squares.

The manner in which the predetermined value of X is arrived at, as determined for the above illustrated examples, is given by the solution to formula (1) as set forth in (2) through (5) given below.

$$[\sqrt{9}\,(1+9)]/2 = 15 \tag{2}$$

$$[\sqrt{25}\,(1+25)]/2 = 65 \tag{3}$$

$$[\sqrt{49}\,(1+49)]/2 = 175 \tag{4}$$

$$[\sqrt{81}\,(1+81)]/2 = 369 \tag{5}$$

The above illustrate certain of a great variety of arrangements for the game puzzle 10 of the present invention. By providing different sets of elements 25, a player may select which puzzle, in the group of four illustrated, he or she may wish to attempt to solve. In this manner, depending upon the age and intelligence of the player, the respective sets 35 through 38 may be selected. In addition, when the solution is obtained, the diagonal rows 39 illustrated by the broken lines on FIG. 1 also add up to the particular number in the respective border. FIG. 1 has been illustrated with the solution to one game illustrated in formula (4) above.

The game 10 further includes solution means 40 adapted to be operatively positioned on the playing board 12 for each of the respective groups, such that a player may quickly determine if the proper solution to the number game 10 has been obtained. The solution means 40 including a sheet 42 having positioned thereon the correct numerals 44 for the group of the game selected.

The numerals 44 extend in overlapping relationship to a respective one of the squares 18. Securement means is provided for the sheet 42 and is adapted to be removably secured to the playing board 12 along substantially one end 16 thereof. The playing board 12 having an elongated groove 46 extending along one edge 16 thereof, and the sheet 42 having a protrusion 48 extending outwardly from one end 50 thereof and adapted to be releasably positioned in frictional engagement with the groove 46. The solution means 40 is generally for one solution, since four solutions are obtainable for each puzzle arrangement.

A set of four solution means 40 may be provided, such that one may be used with each particular problem of the game. In this manner the player may check his or her accuracy as to the obtainment of the solution to the game rather than having to add up each row individually.

Although there has been illustrated four mathematical problems on the playing board 12, less than, or more than, that number may be provided.

Accordingly, the playing board 12 has a group of borders 27, 28, 29, and 30 that extend outwardly from the center of the surface 14 in concentric relation to each other. Each border may have a square shape with the corresponding indicium 31 therein to aid the person solving the puzzles. The indicium 31 is in alignment with each of the rows 20 and 22 and is of a value corresponding to each puzzle, four being illustrated, that may be solved.

Figure 8:
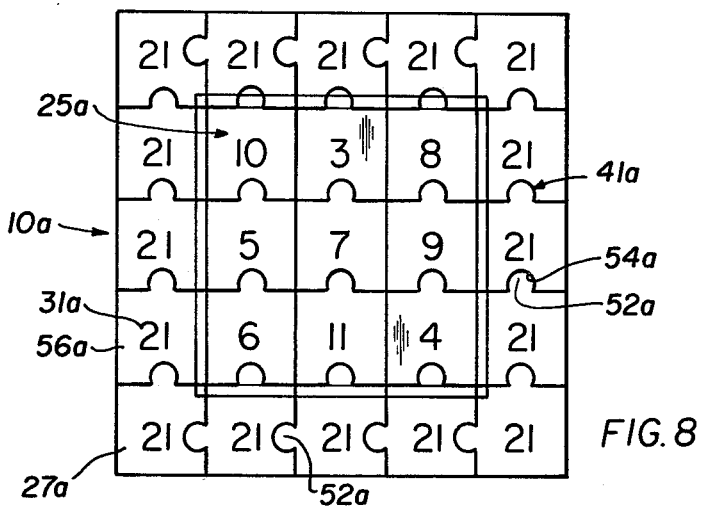
FIGS. 8 through 10 are top planar views of jig saw puzzles incorporating the novel numerical sequence of the present invention.
Figure 9:
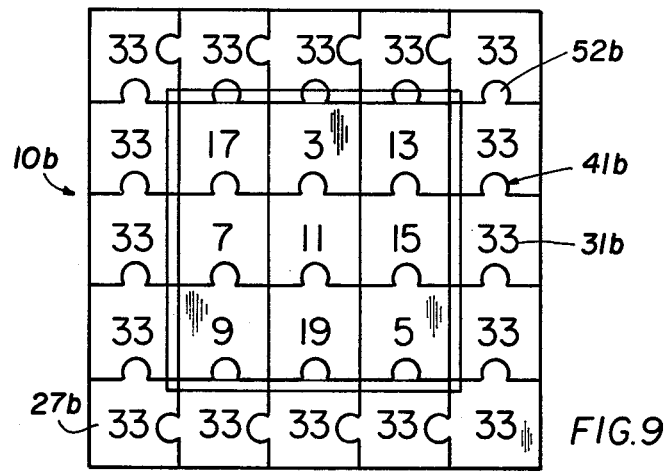
Figure 10:
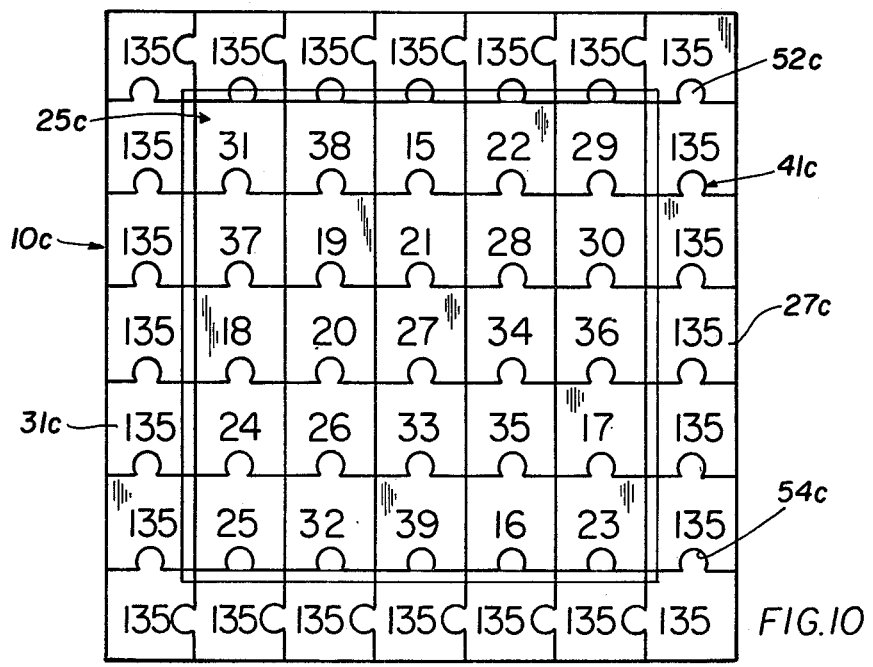
Figure 2:
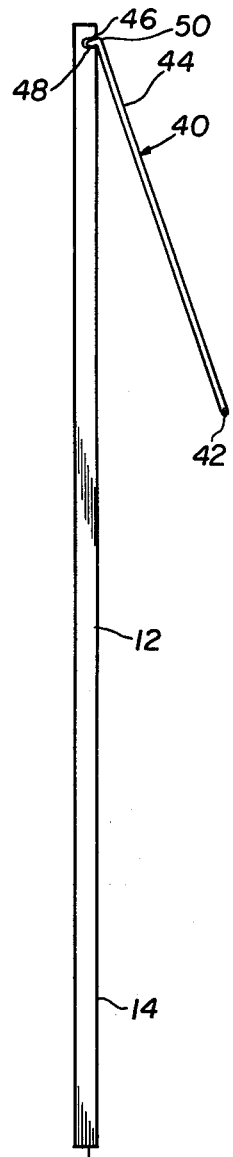
FIG. 2 illustrates a side view of the playing board of FIG. 1.

FIGS. 8 through 10 illustrate another embodiment of the present invention in which the number problem game is in the form of a jig saw puzzle that when assembled in a proper manner will provide the desired solution to the game.

FIG. 8 illustrates number problem game 10a which is comprised of a plurality of individual elements 25a that have associated with each other retaining means 41a that are designed to obtain an interlocking relationship therebetween. The retaining means 41a may include a protrusion or extension 52a on each of the elements 25a and a mating recess 54a on certain of the elements 25a. The individual elements in the puzzle 10a may be rectangular in shape such that the configuration of the puzzle elements 25a do not teach or provide the solution. Stated otherwise, the puzzle 10a is not solvable merely by the interlocking relationship of the elements alone.

The border 27a may be comprised of individual elements 56a that are adapted to interlock with each other by retaining means 41a associated with elements 25a and 56a. The border elements 56a may have indicium 31a which is the solution to the puzzle 10a. In contrast to the previously described examples, the illustration in FIG. 8 is one in which $a = 3$, $N = 11$, and $n = 9$. In this manner the series of numbers are consecutive and include the numerals 3, 4, 5, 6, 7, 8, 9, 10 and 11. The solution to the equation as illustrated in FIG. 8 is $$X = [\sqrt{9}(3+11)]/2 = (3 \times 14)/2 = 42/2 = 21. \quad (6)$$

Accordingly, FIG. 8 illustrates an example in which the first number is not one and the series is consecutive. The solution of X is the number 21 which is contained in the border elements 56a.

FIG. 9 illustrates a jig saw puzzle 10b that is similar in construction to that illustrated in FIG. 8 with a different number as the sum of X, which is 33. In this embodiment it will be noted that $N = 19$ and $a = 3$. The series is 3, 5, 7, 9, 11, 13, 15, 17 and 19. In this example the numbers are not consecutive in that the series is of a constant interval with a skipping between numerals. To state otherwise, every other number in the series is utilized.

FIG. 10 illustrates a jig saw puzzle which may be similar in construction to that illustrated in FIG. 8 except that a greater number of individual elements 25c are utilized. The equation in this instance for puzzle 10c is selected such that $a = 15$ and $N = 39$. This shows the flexibility of the equation in that $X = 135$. The series contains 25 consecutive numbers of 15, 16, 17 ... 37, 38 and 39. In this manner the first and last numbered indicia of the series may be selected to vary the degree of challenge of the game. A variety of numbers may be selected provided that n is an integer having a square root that is a whole number. The above examples also pertain to the embodiment illustrated in FIGS. 1 through 7 and vice versa.

Although illustrative embodiments of the invention have been described in detail herein with reference to the accompanying drawings, it is to be understood that the invention is not limited to the precise embodiments and that various changes and modifications may be effected therein without departing from the scope or spirit of the invention.

I claim:

1. A number problem game, which comprises:
    A. a playing board having a planar surface thereon,
    B. an odd number of squares arranged in an equal number of horizontal and vertical rows intersecting each other on said playing board,
    C. a plurality of playing elements with each element having a different sequentially numbered indicia thereon, said elements being arrangeable on said squares of said board to satisfy a predetermined value which is satisfied by the arithmetical equation:

$X = [\sqrt{n}(a + N)]/2$ wherein:
    a = first numbered indicia of a series
    N = last numbered indicia of a series
    n = total number of elements in a series
    $\sqrt{n}$ = being an integer, and the interval in the series is a constant such that when said plurality of elements are properly positioned on said squares, the sum of the numbered indicia on said elements on each of said horizontal and vertical rows is equal to X,
    D. a plurality of borders on said playing board in surrounding relationship to respective groups of odd numbers of said squares, each one of said borders having indicium thereon equivalent to one of said predetermined values of X,
    E. solution means adapted to be operatively positioned on said playing board for each of said respective groups, such that a player may quickly determine if the proper solution to the number game has been obtained,
    F. said solution means including a sheet having positioned thereon the correct numerals for the group of the game selected, said numerals extending in overlapping relationship to a respective one of said squares,
    G. coupling means for removably securing said sheet to said playing board along substantially one end thereof, and
    H. said coupling means includes:
        (1) an elongated groove extending along one edge of said playing board, and
        (2) a protrusion extending outwardly from one end of said sheet and adapted to be releasably positioned in frictional engagement with said groove.

2. A number problem game as in claim 1, wherein the sum of the numbered indicia on each of said elements positioned on the diagonal rows formed by said squares is also equal to the sum specified by X.

3. A number problem game as in claim 1, wherein said indicium of each of said groups is positioned in substantial alignment with each of said rows.

4. A number problem gas as in claim 1, and retaining means on each of said elements such that they are magnetically attracted to said playing board.

5. A number problem game as in claim 1, wherein said plurality of playing elements are divided into respective sets each of said sets being of a select number of said elements for use in the solution of the game with one of said groups.

6. A number problem game as in claim 5, wherein each of said sets of said elements are readily distinguishable from each other.

7. A number problem game as in claim 6, wherein four of said sets of said elements are provided.

8. A number problem gas as in claim 1, wherein said equation is satisfied by providing 49 of said numbered elements.

9. A number problem game as in claim 8, wherein said predetermined value of X on one of said borders is 175 and includes said elements numbered 1 through 49 inclusive.

10. A number problem game as in claim 1, wherein said odd number of squares is divided into 49 squares that are divided into 7 of said horizontal rows and 7 of said vertical rows.

11. A number problem game as in claim 1, wherein said predetermined value of X on one of said borders is 15.

12. A number problem gas as in claim 1, wherein said equation is satisfied by providing 9 of said numbered elements.

13. A number problem game as in claim 12, wherein one of said borders is divided into 9 squares that are divided into 3 of said horizontal rows and 3 of said vertical rows.

14. A number problem game as in claim 1, wherein said equation is satisfied by providing 25 of said numbered elements.

15. A number problem game as in claim 1, wherein said equation is satisfied by providing 81 of said numbered elements.

16. A number problem game as in claim 1, wherein said numbered indicia on said elements are consecutively numbered.

17. A number problem game as in claim 1, wherein said numbered indicia on said elements follow in an interval separated by an equal numeric value.

18. A number problem game as in claim 1, wherein four of said borders on said planar surface are provided, each of said borders being square in configuration and extending in concentric relationship to each other.

19. A jig saw puzzle number problem game, which comprises:
    A. a plurality of individual elements with each element having a different numbered indicia thereon, said elements being arrangeable to form an odd number of squares arranged in an equal number of horizontal and vertical rows intersecting each other to satisfy a predetermined value which is satisfied by the mathematical formula:

$$X = [\sqrt{n}\,(a + N)]/2$$

wherein:
a = first numbered indicia of a series
N = last numbered indicia of a series
n = total number of elements in a series
$\sqrt{n}$ = being an integer, and the interval in the series is a constant B. said plurality of elements when properly positioned are such that the sum of the numbered indicia on said elements on each of said horizontal and vertical rows is equal to X, and the sum of the numbered indicia on each of said elements positioned on the diagonal rows formed by said squares is also equal to the sum specified by X, C. a border surrounding the perimeter of said squares and having indicium thereon equivalent to said predetermined value of X, D. retaining means for releasably securing said individual elements in interlocking relationship to each other, E. said retaining means includes a protrusion on certain of said elements and a recess on other of said elements so as to obtain an interlocking relationship with respect thereto and the solution to the puzzle is not solvable merely by said interlocking relationship of said elements alone F. solution means adapted to be operatively positioned on the assembled elements such that a quick determination can be made if a proper solution to the puzzle number problem gas has been obtained, G. said solution means including a sheet having positioned thereon the correct numerals for the puzzle number problem game, said numerals extending in overlapping relationship to a respective one of said elements, and H. coupling means for removably securing said sheet to the puzzle number problem game along substantially one end thereof.

20. A jig saw puzzle number problem game, as in claim 19, wherein said border is comprised of individual elements.

* * * * *